United States Patent

Wong

[11] Patent Number: 5,905,773
[45] Date of Patent: May 18, 1999

[54] APPARATUS AND METHOD FOR REDUCING SPEECH RECOGNITION VOCABULARY PERPLEXITY AND DYNAMICALLY SELECTING ACOUSTIC MODELS

[75] Inventor: Chi Wong, Palo Alto, Calif.

[73] Assignee: Northern Telecom Limited, Montreal, Canada

[21] Appl. No.: 08/623,635

[22] Filed: Mar. 28, 1996

[51] Int. Cl.$^6$ ........................................ H04M 1/64
[52] U.S. Cl. ...................... 379/88.03; 379/88.19; 704/275
[58] Field of Search ................... 379/67, 88, 89, 379/67.1, 88.01, 88.02, 88.03, 88.04, 88.19, 88.21; 395/2.79, 2.84, 2.65; 704/270, 273, 275, 277

[56] References Cited

U.S. PATENT DOCUMENTS

| | | | |
|---|---|---|---|
| 4,827,500 | 5/1989 | Binkard et al. | 379/88 |
| 4,922,538 | 5/1990 | Tchorzewski | 379/88 |
| 4,959,855 | 9/1990 | Daudelin | 379/213 |
| 5,091,947 | 2/1992 | Ariyoshi et al. | 381/42 |
| 5,165,095 | 11/1992 | Borcherding | 379/88 |
| 5,297,183 | 3/1994 | Bareis et al. | 379/59 |
| 5,325,421 | 6/1994 | Hou et al. | 379/67 |
| 5,353,336 | 10/1994 | Hou et al. | 379/67 |
| 5,390,278 | 2/1995 | Gupta et al. | 395/2.52 |
| 5,638,425 | 6/1997 | Meador, III et al. | 704/270 |
| 5,675,707 | 10/1997 | Gorin et al. | 395/2.66 |

FOREIGN PATENT DOCUMENTS

| | | | |
|---|---|---|---|
| 0 045 941 A1 | 2/1982 | European Pat. Off. | H04M 1/27 |
| 0 105 441 A1 | 4/1984 | European Pat. Off. | H04Q 3/42 |
| 0 568 979 A1 | 11/1993 | European Pat. Off. | H04M 1/27 |

OTHER PUBLICATIONS

Kimball et al., "Recognition Performance and Grammatical Constraints" Speech Recognition, Defense Advanced Research Projects Agency, pp. 53–59, (1986).

Primary Examiner—Fan S. Tsang
Attorney, Agent, or Firm—W. Glen Johnson

[57] ABSTRACT

A method of reducing the perplexity of a speech recognition vocabulary and dynamically selecting speech recognition acoustic model sets used in a simulated telephone operator apparatus. The directory of users of the telephone network is subdivided into subsets wherein each subset contains the names of users within a certain location or exchange. A speech recognition vocabulary database is compiled for each subset and the appropriate database is loaded into the speech recognition apparatus in response to a requested call to the location covered by the subset. Furthermore, a site-specific acoustic model set is dynamically loaded according to the location of a calling party. An apparatus for carrying out the method is also discussed.

10 Claims, 2 Drawing Sheets

APPARATUS AND METHOD FOR REDUCING SPEECH RECOGNITION VOCABULARY PERPLEXITY AND DYNAMICALLY SELECTING ACOUSTIC MODELS

FIELD OF THE INVENTION

This invention relates to automatic speech recognition in telecommunication systems and to the use of such systems to provide large scale voice activated dialing and information retrieval services.

1. Background to the Invention

In the early development of telephone systems it was commonplace for a telephone subscriber to converse directly with a telephone operator at a telephone central office. The telephone subscriber would verbally request the telephone operator to complete a connection to a called party. As telephone exchanges were small the telephone operator was aware of virtually all of the subscribers by name and manually completed the requested connection. With the advent of dial telephone services, calls within an exchange could be completed automatically, and only certain toll calls required operator assistance. Today, operator assisted calls have become the exception and are usually comparatively expensive. Machine-simulated operator functions, including limited speech recognition services, have recently been available for expediting some typical operator-assisted functions. This includes "collect" long distance calls wherein completion of the connection is contingent upon the called party agreeing to pay for the service. However, these functions are limited to the simple recognition of "yes" or "no" so there is little room for non-functionality due to uncertainty as to which word was spoken. There have also been advancements in voice recognition services relating to directory assistance but these too are directed to a very limited vocabulary.

2. Prior Art

The prior art contains several recent developments pertaining to voice recognition in general, and to voice recognition applicable to telecommunication systems in particular.

U.S. Pat. No. 5,091,947, which issued Feb. 25, 1992 to Ariyoshi et al, entitled "Speech Recognition Method and Apparatus", discloses a voice recognition system for comparing both speaker dependent and speaker independent utterances against stored voice patterns within a coefficient memory. The voice identification comparator selects the one voice pattern having the highest degree of similarity with the utterance in question.

In U.S. Pat. No. 5,165,095, which issued on Nov. 17, 1992, Borcherding discloses a voice recognition system to initiate dialog to determine the correct telephone number. According to the '095 patent, the calling party is first identified so that a database containing speaker templates can be accessed. These templates are then used to compare the dial command so that the dialing instructions can be recognized and executed. An example of a dialing directive in the patent is "call home", with "call" being the dial command and "home" being the destination identifier.

Gupta et al, in U.S. Pat. No. 5,390,278 issued Feb. 14, 1995, disclose a flexible vocabulary speech recognition for recognizing speech transmitted via the public switched telephone network. This voice recognition technique is a phoneme based system wherein the phonemes are modeled as hidden Markov models.

In spite of these ongoing developments, the functionality of automatic recognition of human speech by machine has not advanced to a degree wherein a calling party can simply speak the called party's name and thereafter be connected as reliably as a human operator in situations where the database for a potential called party is very large (greater than 100 names).

SUMMARY OF THE INVENTION

The present invention is in the field of human speech recognition performed by machines and more particularly relates to a reduction of the perplexity of the speech recognition task in the context of names spoken by a telephone user in a telephone system.

Individual users of telephone networks are divided into subsets to facilitate identification of the vast number of subscribers to the service. In the public network these subsets are local exchanges. Private switching networks such as the Nortel Electronic Switching Network (ESN) assigns individual ESN numbers to each location within the private network. The present invention relies on these subsets or location identifiers to reduce the perplexity of a speech recognition application.

Therefore in accordance with a first aspect of the present invention, there is provided a telephone network including a plurality of telephone exchanges, each for serving a plurality of telephone terminals and each being interconnected with at least one other of the telephone exchanges for providing telephone communications between users of the telephone terminals. The network function includes a simulated telephone operator apparatus for receiving a speech request from a user for connection to another telephone user and to translate this request into a directory number for use by the appropriate one of the telephone exchanges. The translation is in accordance with a speech recognition algorithm and an active speech recognition vocabulary selected in accordance with the origin of the request.

In an ESN application the active speech recognition vocabulary is limited to the names of the individuals serviced by the ESN number. In a preferred embodiment, the ESN number, which is also a location code, is contained in the first two or three digits of the directory number.

In accordance with a second aspect of the invention there is provided a simulated telephone operator server for a telephone network. The server has means for storing voice utterances of a calling party telephone user and means responsive to location information in association with the telephone user for selecting an active speech recognition vocabulary. Speech detection means are provided for processing the stored voice utterance in accordance with a speech recognition algorithm and the active speech recognition vocabulary. Directory lookup means identify a directory listing of a called party corresponding to a result of the processing by the speech detection means. The server also includes means for transmitting the directory listing to a telephone exchange serving the called party.

In accordance with a further aspect of the invention there is provided a telephone exchange comprising: a plurality of ports for serving a plurality of telephone users' telephone instruments via telephone lines; a trunk facility for connection to another telephone exchange; a switching network for connecting and disconnecting the telephone instruments; a controller means for causing a newly OFF HOOK telephone instrument to be coupled via the switching network with a solicitation signal, and subsequently for being responsive to a telephone number received in association with the newly OFF HOOK telephone instrument for completing a telephone call via the switching network. The exchange also includes an originating register means for storing voice band signals received from the newly OFF HOOK telephone instrument via the switching network. Means are provided for detecting digits represented by frequency signals, within the stored voice band signals, in accordance with a standard for key pad dialed telephone numbers and for transmitting detected digits to the call controller. A simulated telephone operator apparatus receives and translates voice band signals in accordance with a speech recognition algorithm and an active speech recognition vocabulary selected in accordance with the origin of the voice band signals into a directory number for use by the controller means. An interface facility is provided for transmitting the stored voice band signals via the switching network to the simulated telephone operator server apparatus in an event wherein the voice band signals did not include a key pad dialed digit.

In accordance with yet a further aspect of the present invention there is provided a method of detecting a voiced speech request of a calling party for connection to another user of an automatic telephone exchange. The method comprises storing a plurality of speech recognition vocabularies in association with geographic location of users; receiving the voiced request and information as to the geographic location of the user having voiced the request from the automatic telephone exchange; selecting an active speech recognition vocabulary in accordance with the information as to the geographic location of the user and, in accordance with a speech recognition algorithm and the selected active speech recognition vocabulary, translating the received request into a directory number for use by the automatic telephone exchange in setting up a telephone connection between the calling telephone user and the other telephone user.

BRIEF DESCRIPTION OF THE DRAWINGS

The invention will now be described in greater detail with reference to the attached drawings wherein.

DETAILED DESCRIPTION OF THE INVENTION

Figure 1:
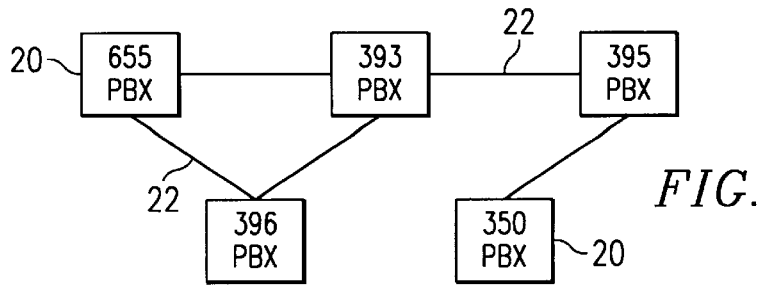
FIG. 1 is a block diagram illustrating trunk connections between private switch locations.

The following description relates to an enterprise-wide speech directory calling service within a company or corporation having a number of locations. Each location is assigned a unique electronic switching network (ESN) location code or ESN number. As shown in the block diagram of FIG. 1, the on-site PBX 20 at each location is connected to each other location via trunk connectors 22. In this discussion the ESN comprises a three-digit code to identify the location. It is to be understood, however, that it is not essential to use all three digits to identify the location as it may be sufficient to use the first two for example.

Figure 2:
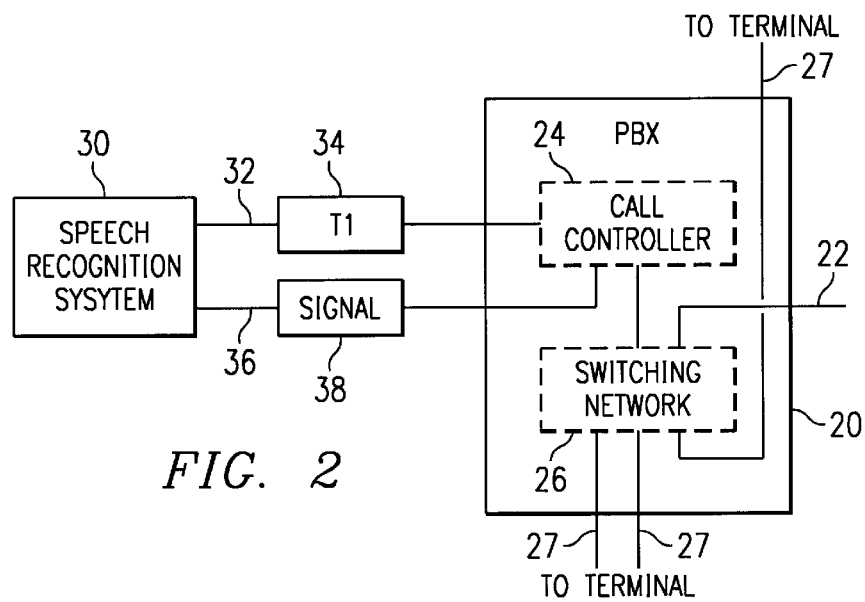
FIG. 2 is a block diagram of the system hardware architecture.
Figure 5:
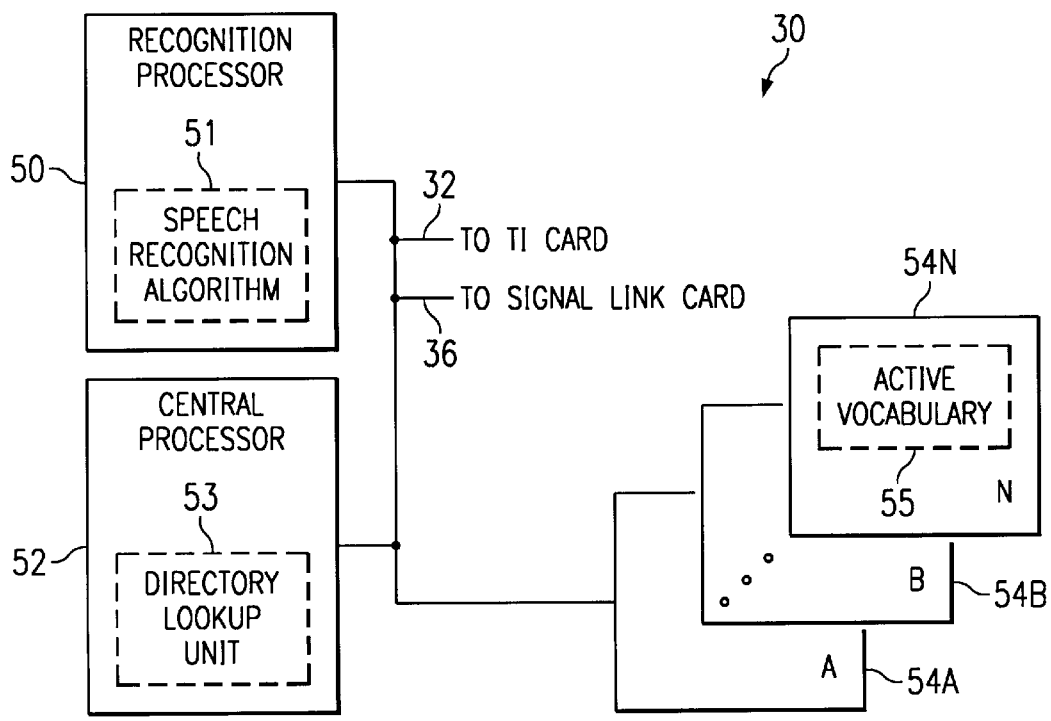
FIG. 5 is a more detailed block diagram of the speech recognition system shown in FIG. 2.

FIGS. 2 and 5 collectively illustrate the hardware architecture in accordance with a preferred embodiment of the invention. As shown, PBX 20 is connected to trunk 22 and to a plurality of on site telephone sets as known in the art.

The speech recognition system 30 of the invention is connected to the PBX 20 via T1 line 32 via T1 card 34 and via signal link 36 and signal link card 38. Speech recognition system 30 includes a speech recognition processor 50 operating on a speech recognition algorithm 51, central processor 52 and control units (e.g. directory lookup unit 53) as well as N memory cards 54A–54N for storing active speech recognition vocabulary data bases 55.

As is well known in the art, PBX 20 includes a switching network 26 coupled to the trunk 22 and the aforementioned telephone sets via ports 27 in conjunction with a supervisory call controller 24 for establishing, servicing and breaking down calls for on-site and remote telephones accessible through the switching network. Although FIG. 1 refers to a private switching network using ESNs, it is to be understood that the invention is not limited to such networks but can also be adapted to use in public switching systems.

One objective metric used to measure the accuracy of a speech recognition system is the Word Error Rate (WER). The WER is defined as the total number of incorrectly recognized words made by a speech recognition system divided by the total number of words spoken by a user of the system.

$$WER = \frac{\text{NumberofErrorsMadebyRecognizer}}{\text{NumberofWordsSpokenbyUser}}$$

The present invention makes use of information as to the calling party's location for automatically assisting in improving the WER of a speech recognition system on a spoken called party's name for the purpose of connecting a telephone call.

It has been empirically shown that the WER of a speech recognition system will vary with the square root of the perplexity of the vocabulary of words being recognized. [Kimbal, O., et al., "Recognition Performance and Grammatical Constraints", Proceedings of a Workshop on Speech Recognition, Report Number SAIC-86/1546, Defense Advanced Research Projects Agency, Palo Alto, Feb. 19–20, 1986.]

$$WER \propto \sqrt{\text{Perplexity}}$$

The perplexity of a vocabulary is defined as the measure of the constraint imposed by a grammar, or the level of uncertainty given the grammar of a population of users. Perplexity is mathematically modeled and quantified in the following way:

$$H = -\frac{1}{|V|} \sum_{w \in V} P(w) \cdot \log P(w)$$
$$B = 2^H$$

where:

H is entropy

P(w) is the probability of w being spoken

B is the perplexity of the application

The vocabulary of words in this implementation consists entirely of proper names; location names, and a small number of key words for command and control. For large corporations with a large number of employees, the proper names become the determining factor in measuring the perplexity since the number of employees will overwhelm the number of location names and key words. Thus location names and key words can be ignored in this calculation. If we make a simplifying assumption that every name is spoken with equal probability, then the equation above can be simplified to the following:

$$\text{Perplexity} = \sqrt[|L|]{|S|}$$

where:

L is the average number of words in a sentence

S is the number of sentences in the vocabulary V

If we further make the simplification that proper names contain two words—first and last name—and the number of sentences in the vocabulary is equivalent to the number of employee names, then we can further reduce the equation to the following:

$$\text{Perplexity} = \sqrt{|S|}$$

If we make the assumption that the amount of confusability between names within a large database will be similar between large databases, the accuracy of a speech recognition system has the following relationship with the number of names in the vocabulary:

$$WER \propto \sqrt[4]{\text{NumberofActiveDirectoryNames}}$$

We can observe from the above equations that the WER increases with the perplexity and thus increases with the number of proper names in the vocabulary.

In the past, speech recognition scientists have used various methods to reduce the perplexity in an effort to improve the WER of a speech recognition system. To achieve this result, most of these efforts have been focused at the linguistic level. For example, scientists have used statistical language models and linguistics rules of phonology to reduce perplexity or uncertainty in recognizing a spoken word or phrase.

In this implementation the list of employee names for each location is stored in a separate speech recognition vocabulary. The employee name will normally be associated with the four digits of the telephone number following the three-digit ESN or location code. According to the system of the present invention a calling party wishing to speak to another employee at the same location will simply announce the first and last name of the employee to whom a connection is desired. The speech recognition system will assume that calling party and called party are at the same location and load the active speech recognition vocabulary database containing the names of all employees at that location. Using a conventional speech recognition algorithm the name spoken by the calling party is compared by the system against the names of all employees in the database and the closest match is selected. The name selected is announced to the calling party and the call is automatically connected to the line associated with the telephone number assigned to the called party unless the calling party interrupts the process by saying, "No." Thereafter the voice recognition system releases from the call.

If the called party is at a different location than the calling party, the calling party will first announce the location of the called party followed by the called party's name. The voice recognition system responds by announcing the location and subsequently loading the active voice recognition vocabulary database including the names of all the employees at the announced location of the called party. The voice recognition system then selects the name in the loaded database that most closely matches the name of the called party. The selected name is announced to the calling party and the call is automatically connected to the line associated with the telephone number assigned to the called party unless the calling party interrupts the process by saying, "No." Thereafter the voice recognition system releases from the call.

Because the active voice recognition vocabulary set associated with each ESN or location contains only a portion of the total number of employees of the corporation or company, the WER is much lower than it would be if the complete employee directory was loaded in the database.

The actual decrease in the corporate wide WER (C_WER) is contingent upon how evenly the employees are spread over the different sites. In the best case where the employees are evenly distributed in each site, C_WER will decrease according to the following relation.

$$C\_WER = \frac{WER}{\sqrt[4]{n}}$$

where:

n is the number of sites.

In the worst case, where there is only one employee in each site, except for one site which holds all of the remaining employees, there will be a negligible decrease in the C_WER.

$$C\_WER \propto \sqrt[4]{(m-n)}$$

where:

m is the number of employees in the company.

C_WER≈WER for:

m>>n

In a similar way that ESN information is used by the speech recognition system to dynamically load the active vocabulary set, the ESN information can also be used by the speech recognition system to select the appropriate acoustic model set. Speech recognition systems use previously collected speech samples to serve as reference templates against which new spoken speech samples are matched for classification. Statistical pattern recognition techniques are used to match new speech samples against reference templates to determine the closest match. These reference templates are referred to as acoustic models in the speech recognition system. Acoustic models may vary according to the regional accent and subsequently according to ESN locations. The speech recognition system can use site-specific acoustic models that are dynamically loaded based on the ESN information presented at the time of the call. Having site-specific acoustic models will also decrease the WER of the system.

Figure 3:
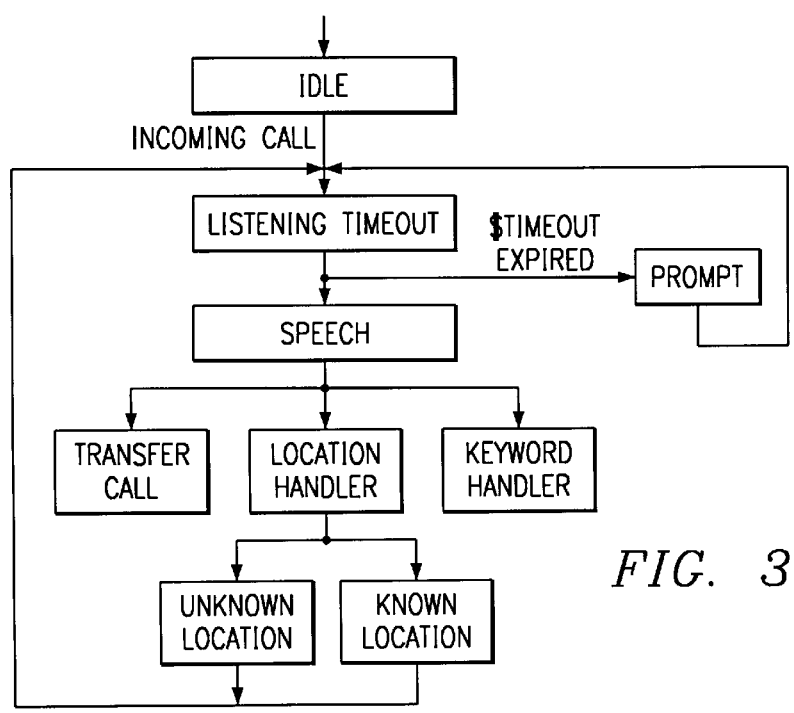
FIG. 3 is an overall system state diagram.
Figure 4:
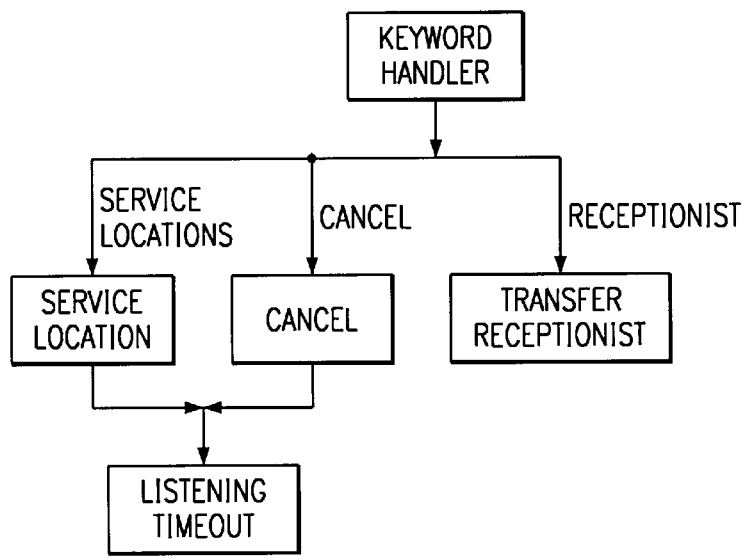
FIG. 4 is a state diagram of the key word handler.

The following specification illustrates an example of the NORTEL Speech Directory Calling Service. The state diagram shown in FIGS. 3 and 4 describes the user interface that users of the service experience and is not meant as an implementation specification. Some parts of the system, such as error recovery and instructions have been omitted.

In the description that follows, the use of italics denotes system state and the use of a dollar sign symbol denotes a parameter.

Description of the States in Alphabetical Order:

Cancel:

Play Who
go to Listening Timeout
Idle:

/* Go to Idle anytime a user hangs up */
On an incoming call
Get ESN information
Set $Location based on ESN information
go to Listening Timeout
Keyword Handler:

Case
    Service Locations:    go to Service Location
    Receptionist:    go to Transfer Receptionist
    Cancel:    go to Cancel
End Case
Known Loc:

Set $Location to $RecognizedWord
Play $Location
Play EmployeeName
go to Listening Timeout
Listening Timeout:

Listen for $Timeout
If the user speaks
    go to Speech
Else
    go to Prompt
Loc Handler:

If $Location is known location
    go to Known Loc
Else
    go to Unknown Loc
Prompt:

Case (state before Listening Timeout )
    Idle:
        Play Who
        go to Listening Timeout
    The rest of the states:
        When $Timeout expires on the first two times
            Play TimeoutHelp.$Location
            $Timeout = 4 sec
            go to Listening Timeout
        When $Timeout expires on the third time
            Play Difficulties
            go to Transfer Receptionist
End Case
Service Location:

Play ServiceAvailable
Play $Location list
Play Who
go to Listening Timeout
Speech:

Load the active vocabulary set from $Location
Get $RecognizedWord from Speech Recognizer
Case ($RecognizedWord)
    Rejection:    go to Rejection Handler
    $Name:    go to Transfer Call
    $Location:    go to Loc Handler
    Key Word:    go to Keyword Handler
End Case
Transfer Call:

Database Lookup for Employee Phone Number
Transfer the call
go to Idle
Transfer Receptionist:

Play TransferReceptionist
Transfer the call to the receptionist
go to Idle

Unknown Loc:

Play NotServiced.$Location
go to Listening Timeout

Index of the Prerecorded Prompts in Alphabetical Order:

Calling:

Calling $Name?
Difficulties:

The system is having difficuities with your request.
Transferring to a receptionist.
EmployeeName:

Employee name?
NotServiced:

This service is not available in $Location. Choose
another location or for a list of serviced ESN locations,
say "Service Locations".
ServiceAvailable:

This service is available for the following Nortel/BNR
locations: $Location list.
TransferReceptionist:

Transferring to a receptionist.
Who:

Who would you like to call?

A specific embodiment of the invention has been disclosed and illustrated. It will be apparent to one skilled in the art that various changes in methodology and/or approach can be made without departing from the spirit and scope of this invention as defined in the appended claims.

I claim:

1. A telephone network including:
   a plurality of telephone exchanges each for serving a plurality of telephone instruments and each being interconnected with at least one other of the telephone exchanges, for providing telephone communications between telephone users associated with the telephone instruments; and
   a simulated telephone operator apparatus for receiving a voiced request from a user for connection to another of the telephone users and translating said request into a directory number for use by one of the telephone exchanges in accordance with a speech recognition algorithm and an active speech recognition vocabulary selected in accordance with the origin of the request.

2. A simulated telephone operator server for a telephone network comprising:
   means for storing voice utterances of a calling party telephone user;
   means responsive to a location information in association with the telephone user for selecting an active speech recognition vocabulary;
   speech recognition means for processing the stored voice utterances in accordance with a speech recognition algorithm and said active speech recognition vocabulary;
   directory lookup means for identifying a directory number of a called party corresponding to a result of said processing by the speech recognition means; and
   means for transmitting the directory listing to a telephone exchange serving said called party.

3. A simulated telephone operator server as defined in claim 2, wherein the directory lookup means defaults to identification by a telephone attendant directory listing in the event of there being no called party directory corresponding to the result of said processing by the speech recognition means.

4. A simulated telephone operator apparatus for receiving a user voiced request for connection to another user of a telephone network and translating said request into a directory number for use by an automatic telephone exchange, in accordance with a speech recognition algorithm and an active speech recognition vocabulary selected in accordance with the origin of the request.

5. A method for detecting a calling telephone user voiced request for connection to another telephone user via an automatic telephone exchange comprising:

storing a plurality of speech recognition vocabularies in association with geographic locations of users;

receiving the voiced request and information as to the geographic location of the calling telephone user from the automatic telephone exchange;

selecting an active speech recognition vocabulary in accordance with the information as to the geographic location of the calling telephone user; and in accordance with a speech recognition algorithm and the selected active speech recognition vocabulary, translating the received request into a directory number for use by the automatic telephone exchange in setting up a telephone connection between the calling telephone user and said another telephone user.

6. A telephone exchange comprising:

a plurality of ports for serving a plurality of telephone instruments;

a switching network coupled to said ports for selectively connecting and disconnecting the telephone instruments;

a simulated operator telephone apparatus in communication with said switching network for receiving and translating voice band signals emanating from a first one of the telephone instruments in accordance with a speech recognition algorithm and an active speech recognition vocabulary selected in accordance with location information corresponding to the first one of the telephone instruments into a destination number; and a call controller in communication with said simulated operator telephone apparatus and said switching network for completing a call involving the first one of the telephone instruments in accordance with the destination number.

7. A method for resolving a voiced connection request into a destination number, comprising the steps of:

selecting an active speech recognition vocabulary in accordance with location information corresponding to an origin of the voiced connection request;

speech recognizing the voiced connection request utilizing the active speech recognition vocabulary; and identifying a directory number corresponding to the recognized voiced connection request as the destination number.

8. A method for resolving a voice connection request emanating from a first telephone user into a destination number of a second telephone user, comprising the steps of:

selecting an active speech recognition vocabulary in accordance with location information corresponding to the location of the first telephone user;

speech recognizing the voiced connection request utilizing the active speech recognition vocabulary; and identifying a directory number corresponding to the recognized voice connection request as the destination number of the second telephone user.

9. A call establishment method, comprising the steps of:

receiving a voiced connection request emanating from a user of a first telephone, the voice connection request specifying a destination number for a second telephone user;

resolving the voiced connection request into the destination number, comprising the steps of:

selecting an active speech recognition vocabulary in accordance with location information corresponding to the location of the first telephone user;

speech recognizing the voiced connection request utilizing the active speech recognition vocabulary;

identifying a directory number corresponding to the recognized voice connection request as the destination number of the second telephone user; and completing a call between the first and second telephone users based on the destination number.

10. The call establishment method of claim 9, further comprising the step of prompting the first telephone user for the voiced connection request.

* * * * *